United States Patent
Iwane et al.

(10) Patent No.: US 7,660,519 B2
(45) Date of Patent: Feb. 9, 2010

(54) AUTOFOCUS APPARATUS

(75) Inventors: Yukikazu Iwane, Kashiwa (JP); Shigeo Takahashi, Kawasaki (JP); Toshimi Watanabe, Yokohama (JP); Toshiaki Maeda, Yokohama (JP)

(73) Assignee: Nikon Corporation, Tokyo (JP)

( * ) Notice: Subject to any disclaimer, the term of this patent is extended or adjusted under 35 U.S.C. 154(b) by 384 days.

(21) Appl. No.: 11/510,688

(22) Filed: Aug. 28, 2006

(65) Prior Publication Data

US 2007/0047941 A1    Mar. 1, 2007

(30) Foreign Application Priority Data

Aug. 31, 2005    (JP) ............... 2005-251272

(51) Int. Cl.
*G03B 3/10* (2006.01)

(52) U.S. Cl. ...................... 396/123; 359/698

(58) Field of Classification Search ............... 396/123, 396/121, 124; 348/208.12, 346; 359/698, 359/823; 382/115, 118
See application file for complete search history.

(56) References Cited

U.S. PATENT DOCUMENTS

| | | | | |
|---|---|---|---|---|
| 5,430,809 A * | 7/1995 | Tomitaka | .................. | 382/173 |
| 5,978,100 A | 11/1999 | Kinjo | | |
| 7,463,302 B2 * | 12/2008 | Kobayashi | .................. | 348/345 |
| 2003/0071908 A1 | 4/2003 | Sannoh et al. | | |
| 2005/0088538 A1 * | 4/2005 | Nozaki et al. | ............ | 348/229.1 |
| 2005/0231628 A1 * | 10/2005 | Kawaguchi et al. | ......... | 348/345 |
| 2006/0182433 A1 * | 8/2006 | Kawahara et al. | ........... | 396/123 |
| 2007/0030381 A1 * | 2/2007 | Maeda | ....................... | 348/345 |

FOREIGN PATENT DOCUMENTS

| | | |
|---|---|---|
| JP | A 9-138470 | 5/1997 |
| JP | A 2003-92701 | 3/2003 |
| JP | A 2003-92726 | 3/2003 |
| JP | A 2003-107335 | 4/2003 |
| JP | A 2003-107555 | 4/2003 |
| JP | A 2003-107567 | 4/2003 |
| JP | A 2003-289468 | 10/2003 |
| JP | 2006208818 A * | 8/2006 |

* cited by examiner

*Primary Examiner*—Melissa Jan Koval
*Assistant Examiner*—Autumn Parker
(74) *Attorney, Agent, or Firm*—Oliff & Berridge, PLC

(57) ABSTRACT

An autofocus apparatus includes an imaging device that captures a subject image through a photographic lens; an AF area determining device that determines a range of image signals to be used for autofocus adjustment based upon image signals provided by the imaging device; a focus adjustment device that adjusts a focal point position achieved through the photographic lens by driving a focus lens so as to maximize contrast achieved with the image signals in the determined range; and a control device that controls the focus adjustment device, if the range of the image signals determined by the AF area determining device has been altered, so as to adjust the focal point position by using image signals in the altered range.

26 Claims, 12 Drawing Sheets

AUTOFOCUS APPARATUS

INCORPORATION BY REFERENCE

The disclosures of the following priority application and publication are herein incorporated by reference:
Japanese Patent Application No. 2005-251272 filed Aug. 31, 2005
U.S. Pat. No. 5,978,100 patented Nov. 2, 1999

BACKGROUND OF THE INVENTION

1. Field of the Invention

The present invention relates to an autofocus apparatus.

2. Description of Related Art

Japanese Laid Open Patent Publication No. 2003-107335 discloses an imaging apparatus that detects the face of a person in a photographic image and executes autofocus adjustment so as to focus on the detected face. The imaging apparatus disclosed in the publication detects the face of a person in image data and executes autofocus adjustment by designating an area containing at least part of the detected face as a focus detecting area.

However, the battery power is bound to be depleted quickly if the focus adjustment operation is executed each time a face is detected.

SUMMARY OF THE INVENTION

An autofocus apparatus according to a first aspect of the present invention includes an imaging device that captures a subject image through a photographic lens; an AF area determining device that determines a range of image signals to be used for autofocus adjustment based upon image signals provided by the imaging device; a focus adjustment device that adjusts a focal point position achieved through the photographic lens by driving a focus lens so as to maximize contrast achieved with the image signals in the determined range; and a control device that controls the focus adjustment device, if the range of the image signals determined by the AF area determining device has been altered, so as to adjust the focal point position by using image signals in the altered range.

In the autofocus apparatus according to the first aspect, if the range of the image signals determined by the AF area determining device has been displaced, it is preferable that the control device controls the focus adjustment device so as to adjust the focal point position by using image signals in the displaced range. If an area size of the range of the image signals determined by the AF area determining device has changed, the control device may control the focus adjustment device so as to adjust the focal point position by using image signals in the range the area size of which has been changed.

The autofocus apparatus according to the first aspect, further includes a face detection device that detects a face of a person by using the image signals provided by the imaging device, and it is preferable that the AF area determining device determines the range of the image signals to be used for the autofocus adjustment by using image signals corresponding to the face detected by the face detection device; and if a position of the face detected by the face detection device has been displaced, the control device controls the focus adjustment device so as to adjust the focal point position by using image signals corresponding to the displaced face. It is preferable that the control device judges that the position of the face has been displaced if the position of the face detected by the face detection device has moved between areas of a photographic image plane divided into a predetermined number of areas and the face is successively detected a predetermined number of times in a divided area following the displacement.

If an area size of the face detected by the face detection device has changed, the control device may control the focus adjustment device so as to adjust the focal point position by using image signals corresponding to the face the area size of which has been changed. It is preferable that the control device judges that the face area size has changed if the face detection device has detected an increase in the face area size at a rate equal to or greater than a predetermined increase rate and then has repeatedly detected the face area size substantially unchanged a predetermined number of times. It is also preferable that the control device judges that the face area size has changed if the face detection device has detected a decrease in the face area size at a rate equal to or greater than a predetermined decrease rate and then has repeatedly detected the face area size substantially unchanged a predetermined number of times.

It is preferable that the focus adjustment device adjusts the focal point position before an operation signal is output from a shutter release operation member. It is preferable that the control device does not engage the focus adjustment device in the focus adjustment if the face detection device has not detected a face.

It is preferable that the control device controls the focus adjustment device so as to first drive the focus lens to a predetermined position at start-up; and that the face detection device starts face detection once the focus lens is driven to the predetermined position. The control device may control the focus adjustment device so as to drive the focus lens to a predetermined position if the face detection device has successively failed to detect a face a predetermined number of times; and the face detection device may resume face detection when the focus lens is driven to the predetermined position. The control device may engage the focus adjustment device in the focus adjustment when a face is first detected by the face detection device after the focus lens is driven to the predetermined position.

It is preferable that the focus adjustment device adjusts the focal point position by using image signals corresponding to a face ranging over a largest area if a plurality of faces has been detected by the face detection device. The focus adjustment device may adjust the focal point position by using image signals corresponding to a predetermined area around eyes in the face detected by the face detection device. The focus adjustment device may also adjust the focal point position by using image signals corresponding to a predetermined area ranging around a position offset from eyes in the face detected by the face detection device by a predetermined extent toward a center of the face.

A camera according to a second aspect of the present invention includes the autofocus apparatus according to the first aspect.

In an autofocus control method according to a third aspect of the present invention, a range of image signals to be used for autofocus adjustment is determined by using image signals of a subject image captured through a photographic lens; a focal point position achieved via the photographic lens is adjusted by driving a focus lens so as to maximize contrast achieved with the image signals; and the focal point position following an alteration in the range of the image signals to be used for the autofocus adjustment is adjusted by using image signals in the altered range.

DESCRIPTION OF PREFERRED EMBODIMENT

Figure 1:
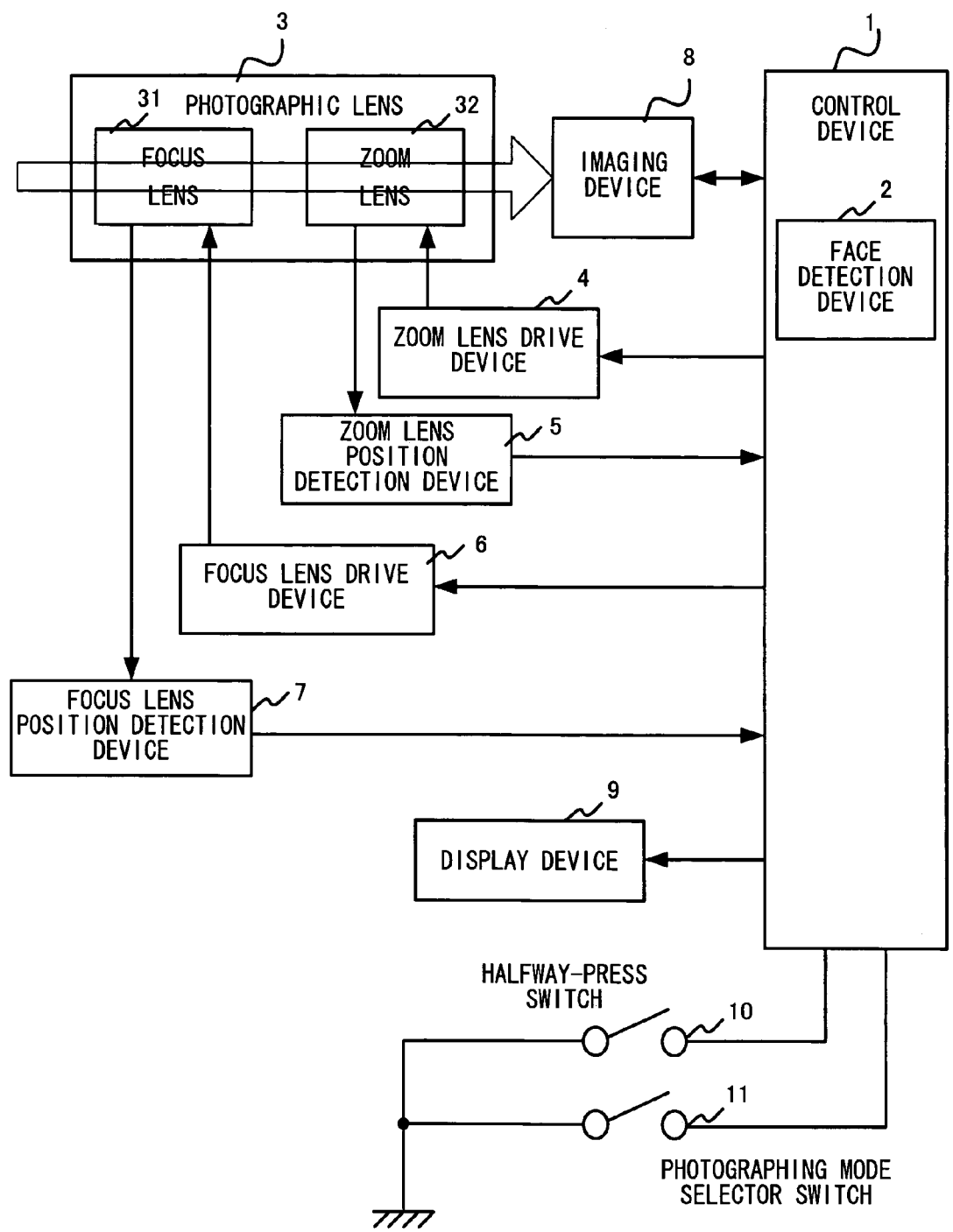
FIG. 1 is a block diagram of a structure adopted in an autofocus apparatus included in a camera achieved in an embodiment of the present invention.

The following is an explanation of an embodiment of the present invention, given in reference to the drawings. FIG. 1 is a block diagram of a structure adopted in an autofocus apparatus included in a camera achieved in the embodiment of the present invention. The camera in FIG. 1 includes a control device 1, a photographic lens 3, a zoom lens drive device 4, a zoom lens position detection device 5, a focus lens drive device 6, a focus lens position detection device 7, an imaging device 8, a display device 9, a halfway-press switch 10 and a photographing mode selector switch 11. This camera may be, for instance, a digital camera.

The control device 1, constituted with a microprocessor unit, controls camera operations based upon programs. The control device 1 includes a face detection device 2 to be detailed later. The photographic lens 3 includes a focus lens 31 and a zoom lens 32 and constitutes a photographic optical system. As the focus lens 31 is driven forward/backward along an optical axis, the focus of the photographic lens 3 is adjusted. In addition, as the zoom lens 32 is driven forward/backward along the optical axis, the focal length of the photographic lens 3 is adjusted.

The zoom lens drive device 4 drives the zoom lens 32 along the optical axis in response to a command issued by the control device 1. The zoom lens position detection device 5 detects the position of the zoom lens 32 along the optical axis and transmits a detection signal to the control device 1.

The focus lens drive device 6 drives the focus lens 31 along the optical axis in response to a command issued by the control device 1. The focus lens position detection device 7 detects the position of the focus lens 31 along the optical axis and transmits a detection signal to the control device 1.

The imaging device 8, which includes an image sensor such as a CCD or a CMOS, captures a subject image formed by a light flux having passed through the photographic lens 3 and provides image signals of the captured image to the control device 1. The control device 1 generates display signals to be used to display the photographic image at the display device 9 and generates recording data to be used to record the photographic image into a recording medium (not shown) by executing specific signal processing on the image signals input thereto.

The halfway-press switch 10, which enters an ON state or an OFF state by interlocking with a depression of a shutter release button (not shown), generates an ON signal in response to a halfway-press operation of the shutter release button and generates an OFF signal as the halfway-press operation is cleared. An operation signal generated via the halfway-press switch 10 is input to the control device 1. It is to be noted that the camera also includes a full press switch (not shown) that interlocks with depression of the shutter release button as well. The full press switch generates an ON signal as the shutter release button is depressed further downward beyond the halfway-press position and generates an OFF signal as the full press operation is cleared.

The control device 1 starts an exposure preliminary operation by driving the imaging device 8 as the halfway-press switch 10 is turned on, and starts a photographing operation as the full press switch is turned on.

The photographing mode selector switch 11 enters an ON state or an OFF state in response to a user operation. The control device 1 selects a photographing mode in which the face detection device 2 executes face detection as the photographing mode selector switch 11 enters an ON state, and selects a photographing mode in which face detection is not executed as the photographing mode selector switch 11 is turned off.

The display device 9 may include, for instance, a liquid crystal monitor. In response to a command issued by the control device 1, the display device 9 displays a reproduced image by using display signals, displays information indicating an area corresponding to a "face" detected by the face detection device 2 or displays information indicating that the face detection by the face detection device 2 is in progress.

(Face Detection)

The face detection device 2 extracts signals corresponding to the "face" of a subject among image signals input thereto from the imaging device 8, in response to a command issued by the control device 1. Based upon the results of the signal extraction, the control device 1 determines the position (the coordinates in the photographic image plane) where the face is present in the image (hereafter referred to as the "face area"), the size of the face area (the number of pixels constituting the face area) and the position (the coordinates in the photographic image plane) of the eyes of the subject (the area where the eyes are present). In order to extract the signals for the "face" of a person, a plurality of extraction methods are pre-evaluated so as to set in advance a weighting coefficient for each of the plurality of extraction methods. The plurality of extraction methods includes, e.g., a method for extracting a predetermined color, a method for extracting a predetermined shape pattern and a method for excluding an area estimated to constitute a background. Then, primary subject images (primary image portions) are extracted through the various extraction methods, the extracted primary portions are weighted in correspondence to the predetermined weighting coefficients and a specific primary portion are selected and extracted based upon the weighting results. U.S. Pat. No. 5,978,100 for instance, discloses such a face extraction method.

(Autofocus Operation)

The control device 1 executes an AF (autofocus) operation through a contrast method of the known art by using signals that correspond to the face area detected by the face detection device 2, among the image signals having been input thereto from the imaging device 8. More specifically, it calculates a cumulative value (the so-called focal point evaluation value) representing the sum of the values of the high frequency component indicated in the image signals corresponding to the face area and outputs a focus lens drive command for the focus lens drive device 6 so as to maximize the cumulative value. The position of the focus lens 31 at which the focal point evaluation value peaks is the focus match position at which the maximum contrast is achieved in the image (the sharpness in the edges is enhanced) by eliminating any blurring around the edges of the subject image captured by the imaging device 8.

Only under specific circumstances to be detailed later, the control device 1 in the embodiment drives the focus lens 31 along the optical axis while detecting its position via the focus lens position detection device 7. During this time, the control device 1 analyzes image signals corresponding to the face area detected at each of various positions assumed by the focus lens 31 in sequence and drives the focus lens 31 to the position at which the contrast in the image of the face area (i.e., the face image) is maximized. The control device 1, the focus lens drive device 6 and the focus lens position detection device 7 together constitute a focus adjustment device.

Figure 2:
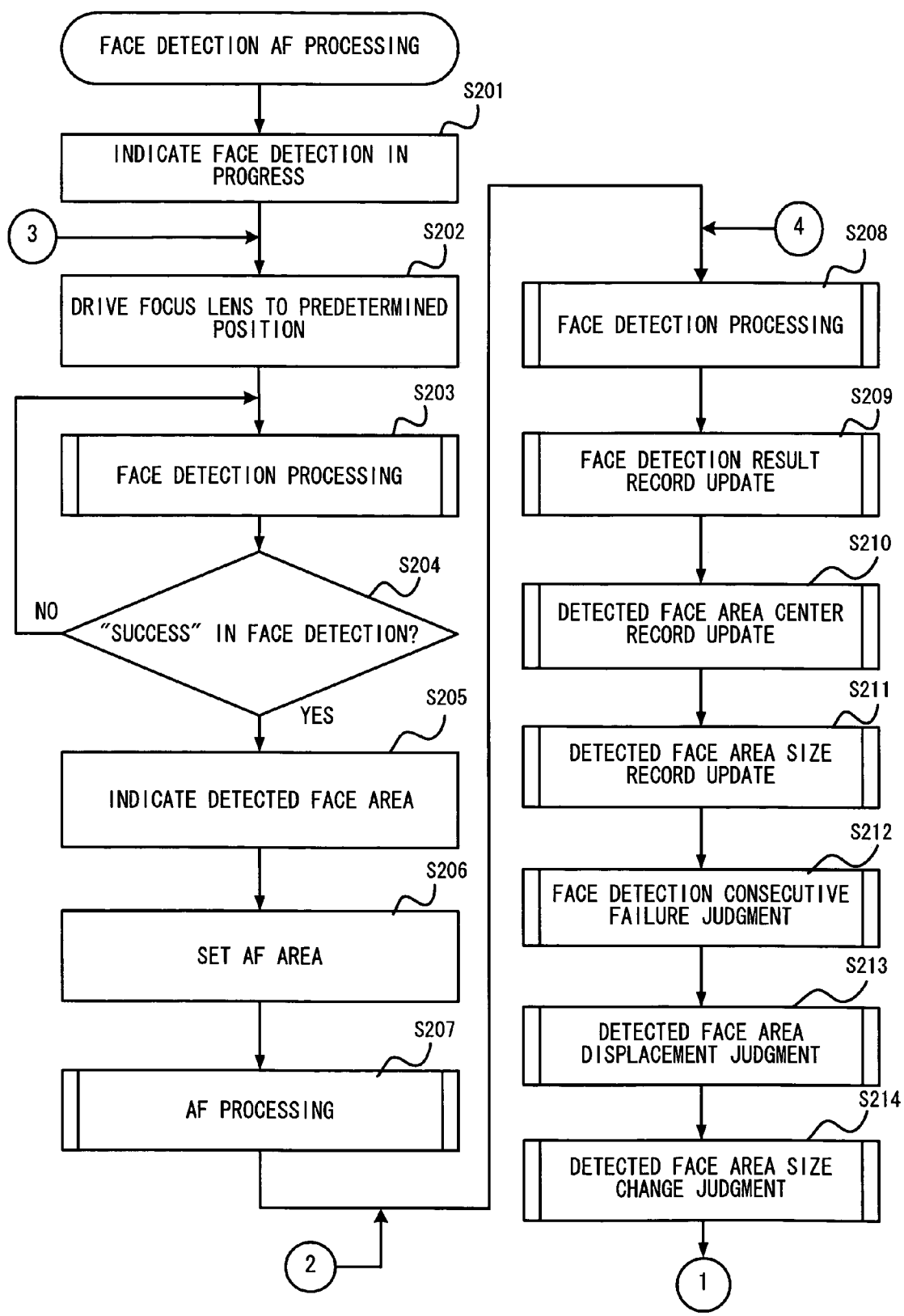
FIG. 2 presents a flowchart of face detection AF processing.
Figure 3:
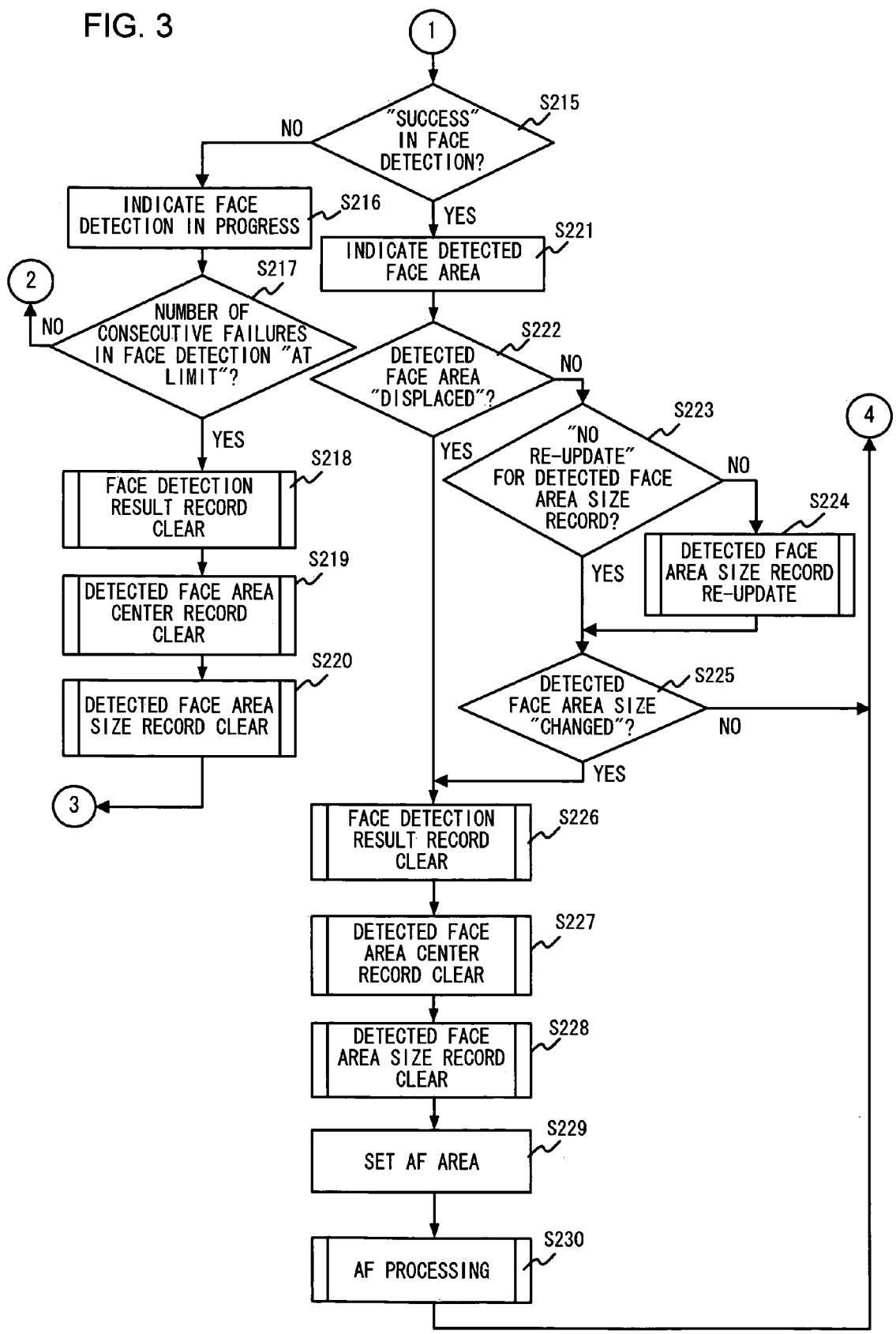
FIG. 3 presents a flowchart of the face detection AF processing in continuation from FIG. 2.

The flow of the face detection AF processing executed by the control device 1 in the camera described above is now explained in reference to the flowchart presented in FIGS. 2 and 3. The processing in FIGS. 2 and 3, which is started up as the photographing mode selector switch 11 is turned on while the camera main switch is in an ON state, is continuously executed until an operation signal from the shutter release operation member (an ON signal from the halfway-press switch 10 in this example) is input. The camera assumes a structure that enables the display device 9 to display a through image while the processing in FIGS. 2 and 3 is executed. The term "through image" is used to refer to an image obtained through each imaging operation as the imaging operation is repeatedly executed before a photographing instruction (an ON signal from the full press switch) is issued and the most recently captured image is displayed at the display device 9 by replacing the previously captured image.

In step S201 in FIG. 2, the control device 1 engages the display device 9 to display information indicating that face detection by the face detection device 2 is in progress and then the operation proceeds to step S202. As a result, a mark indicating that face detection is in progress is superimposed over the through image on display.

In step S202, the control device 1 outputs a command for the focus lens drive device 6 to drive the focus lens 31 to a specific position. Such a specific position represents a focus lens position suited for, for instance, photographing a portrait, at which focus is set on a person present 1 to 2 m from the camera.

In step S203, the control device 1 engages the face detection device 2 to start face detection processing (see FIG. 4) before the operation proceeds to step S204. The flow of the face detection processing is to be described in detail later. In step S204, the control device 1 makes a decision as to whether or not face detection has been executed successfully. The control device 1 makes an affirmative decision in step S204 to proceed to step S205 if a face detection result flag indicates "success", whereas it makes a negative decision in step S204 and returns to step S203 if the flag indicates "failure". After the operation returns to step S203, the face detection processing is started again.

In step S205, the control device 1 outputs a command for the display device 9 to bring up a display indicating the face area having been detected by the face detection device 2 and then the operation proceeds to step S206. Thus, a line indicating the face area is superimposed over the through image on display.

If only one face has been detected, the control device 1 brings up on display a line or frame to indicate the face area. If, on the other hand, a plurality of faces has been detected, it brings up on display lines or frames each indicating one of the plurality of face areas. In step S206, the control device 1 designates an AF area and then the operation proceeds to step S207. The AF area is the autofocus adjustment target area in the photographic image plane. If only one face has been detected, the control device 1 designates the face area as the AF area, but if a plurality of face areas have been detected it designates the face area with the largest area size as the AF area. The control device 1 then engages the display device 9 to indicate the designated AF area. For instance, the AF area may be indicated in green so that it is easily distinguished from the other face areas indicated with white lines.

The control device 1 executes the AF operation described earlier in step S207 and then the operation proceeds to step S208. In step S208, the control device 1 engages the face detection device 2 to start face detection processing (see FIG. 4) before the operation proceeds to step S209.

In step S209, the control device 1 executes face detection result record update processing (see FIG. 5) and then the operation proceeds to step S210. The face detection result record update processing is to be described in detail later.

In step S210, the control device 1 executes detected face area center record update processing (see FIG. 7) and then the operation proceeds to step S211. The detected face area center record update processing is to be described in detail later.

In step S211, the control device 1 executes detected face area size record update processing (see FIG. 9) and then the operation proceeds to step S212. The detected face area size record update processing is to be described in detail later.

In step S212, the control device 1 executes face detection consecutive failure judgment processing (see FIG. 12) and then the operation proceeds to step S213. The face detection consecutive failure judgment processing is to be described in detail later.

In step S213, the control device 1 executes detected face area displacement judgment processing (see FIG. 13) and then the operation proceeds to step S214. The detected face area displacement judgment processing is to be described in detail later.

In step S214, the control device 1 executes detected face area size change judgment processing (see FIGS. 14 and 15), and then the operation proceeds to step S215 in FIG. 3. The detected face area size change judgment processing is to be described in detail later.

In step S215, the control device 1 makes a decision as to whether or not a face has been successfully detected. The control device 1 makes an affirmative decision in step S215 if a face detection result flag indicates "success" to proceed to step S221, whereas it makes a negative decision in step S215 if the flag indicates "failure" to proceed to step S216.

In step S221, the control device 1 outputs a command for the display device 9 to indicate at the display device 9 the face area having been detected by the face detection device 2, and then the operation proceeds to step S222. The detected face area is indicated by adopting a display method similar to that adopted in step S205.

In step S222, the control device 1 makes a decision as to whether or not the detected face area has been displaced. The control device 1 makes an affirmative decision in step S222 if a detected face area displacement judgment flag indicates "displaced" to proceed to step S226, whereas it makes a negative decision in step S222 if the detected face area displacement judgment flag indicates "moving" to proceed to step S223.

In step S226, the control device 1 executes face detection result record clear processing (see FIG. 6) before the operation proceeds to step S227. The face detection result record clear processing is to be described in detail later.

In step S227, the control device 1 executes detected face area center record clear processing (see FIG. 8) before the operation proceeds to step S228. The detected face area center record clear processing is to be described in detail later.

In step S228, the control device executes detected face area size record clear processing (see FIG. 10) before the operation proceeds to step S229. The detected face area size record processing is to be described in detail later.

In step S229 the control device 1 sets the AF area, and then the operation proceeds to step S230. The designated AF area is indicated at the display device 9 by adopting a display method similar to that adopted in step S206. In step S230, the control device 1 executes the AF operation explained earlier, before the operation returns to step S208 in FIG. 2.

In step S223, to which the operation proceeds after making a negative decision in step S222, the control device 1 makes a decision as to whether or not a detected face area size record is not re-updated. The control device 1 makes an affirmative decision in step S223 and proceeds to step S225 if a detected face area size record judgment flag indicates "no re-update", whereas it makes a negative decision in step S223 to proceed to step S224 if the detected face area size record judgment flag indicates "re-update".

In step S224, the control device 1 executes detected face area size record re-update processing (see FIG. 11) before the operation proceeds to step S225. The detected face area size record re-update processing is to be described in detail later.

In step S225, the control device 1 makes a decision as to whether or not the detected face area size has changed. The control device 1 makes an affirmative decision in step S225 to proceed to step S226 if a detected face area size change judgment flag indicates "changed", whereas it makes a negative decision in step S225 if the detected face area size change judgment flag indicates "changing" to return to step S208 in FIG. 2. The operation returns to step S208 if the detected face area has not been displaced and the detected face area size has not changed. In this case, the control device 1 does not execute AF processing and the operation simply returns to step S208.

In step S216, to which the operation proceeds after making a negative decision in step S215, the control device 1 outputs a command for the display device 9 to indicate at the display device that face detection by the face detection device 2 is in progress, and then the operation proceeds to step S217. The "face detection in progress" indication is provided by adopting a display method similar to that adopted in step S201.

In step S217, the control device 1 makes a decision as to whether or not a predetermined number of consecutive face detection failures has occurred. The control device 1 makes an affirmative decision in step S217 if a face detection consecutive failure judgment flag indicates "at limit" to proceed to step S218, whereas it makes a negative decision in step S217 if the flag indicates "under limit" to proceed to step S208 in FIG. 2.

In step S218, the control device 1 executes face detection result record clear processing (see FIG. 6) before the operation proceeds to step S219. The face detection result record clear processing is to be described in detail later.

In step S219, the control device 1 executes detected face area center record clear processing (see FIG. 8) before the operation proceeds to step S220. The detected face area center record clear processing is to be described in detail later.

In step S220, the control device 1 executes detected face area size record clear processing (see FIG. 10) before the operation returns to step S202. The detected face area size record clear processing is to be described in detail later. The operation returns to step S202 when the face detection has resulted in a predetermined number of consecutive failures. Under such circumstances, the control device 1 drives the focus lens 31 to a predetermined position and restarts face detection.

In the processing explained above in reference to FIGS. 2 and 3, the auto focus apparatus executes AF operation if the detected face area has been displaced or if the detected face area size has changed.

Figure 4:
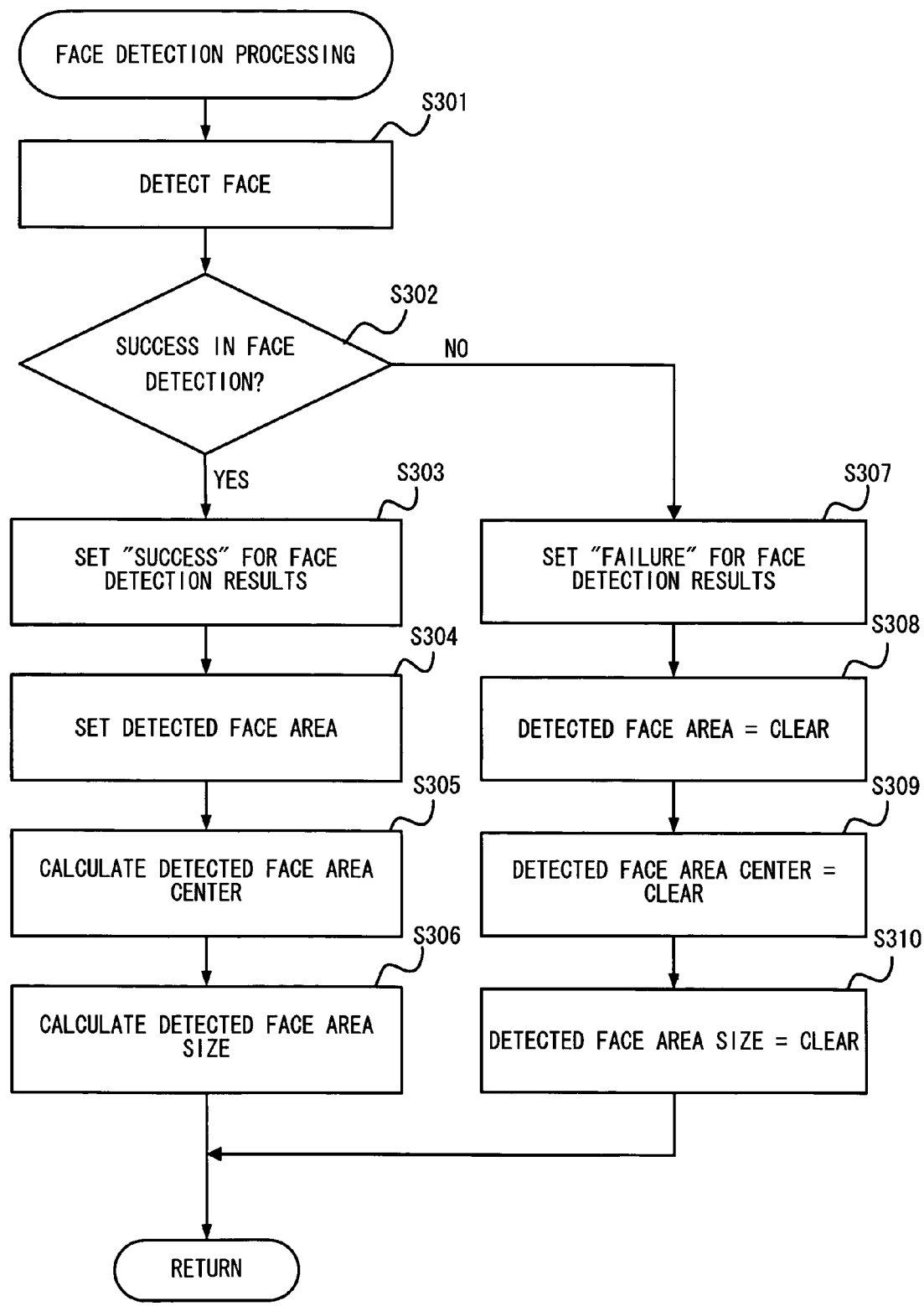
FIG. 4 presents a flowchart of face detection processing.

The flow of the face detection processing is now explained in reference to the flowchart presented in FIG. 4. In step S301, the control device 1 issues a face detection instruction for the face detection device 2 and then the operation proceeds to step S302. In response, the face detection device 2 executes face detection on the through image. In step S302, the control device 1 makes a decision as to whether the face detection has been a success or a failure. The control device 1 makes an affirmative decision in step S302 if a face area has been extracted by the face detection device 2 from the through image to proceed to step S303, whereas it makes a negative decision in step S302 to proceed to step S307 if no face area has been extracted.

In step S303, the control device 1 sets "success" at the face detection result flag and then the operation proceeds to step S304. In step S304, the control device 1 sets the detected face area (face area) in correspondence to the extraction results obtained at the face detection device 2 and then the operation proceeds to step S305. In step S305, the control device 1 calculates the coordinates of the central point in the data constituting the detected face area and designates the calculation results as the face area center before the operation proceeds to step S306. In step S306, the control device 1 counts the number of sets of data (the number of pixels) constituting the detected face area and designates the count results as the face area size before ending the processing in FIG. 4.

In step S307, to which the operation proceeds after making a negative decision in step S302, the control device 1 sets "failure" at the face detection result flag, and then the operation proceeds to step S308. In step S308, the control device 1 clears the face area setting details before the operation proceeds to step S309. In step S309, the control device 1 clears the setting details with regard to the face area center before the operation proceeds to step S310. In step S310, the control device 1 clears the setting details with regard to the face area size, before ending the processing in FIG. 4.

Figure 5:
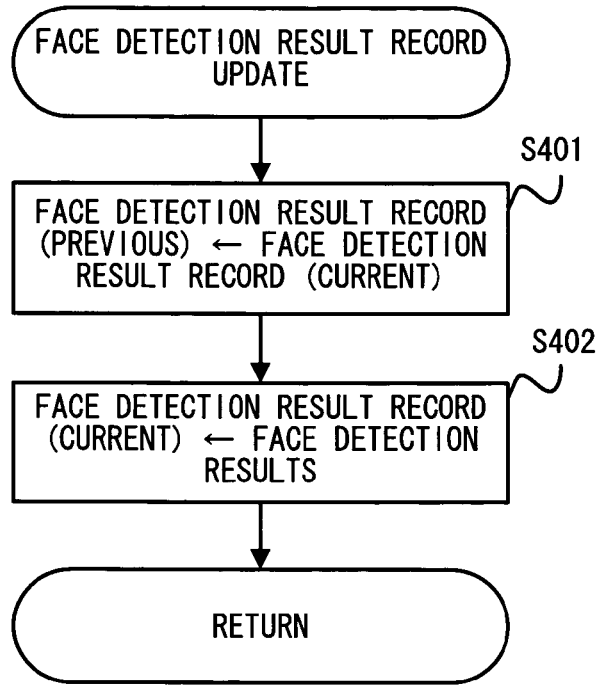
FIG. 5 presents a flowchart of face detection result record update processing.

The flow of the face detection result record update processing is explained in reference to the flowchart presented in FIG. 5. In step S401, the control device 1 relocates the contents in (current) in the face detection result record to (previous) in the face detection result record and then the operation proceeds to step S402. The control device 1 relocates the contents of the face detection result flag to (current) in the face detection result record before ending the processing in FIG. 5.

Figure 6:
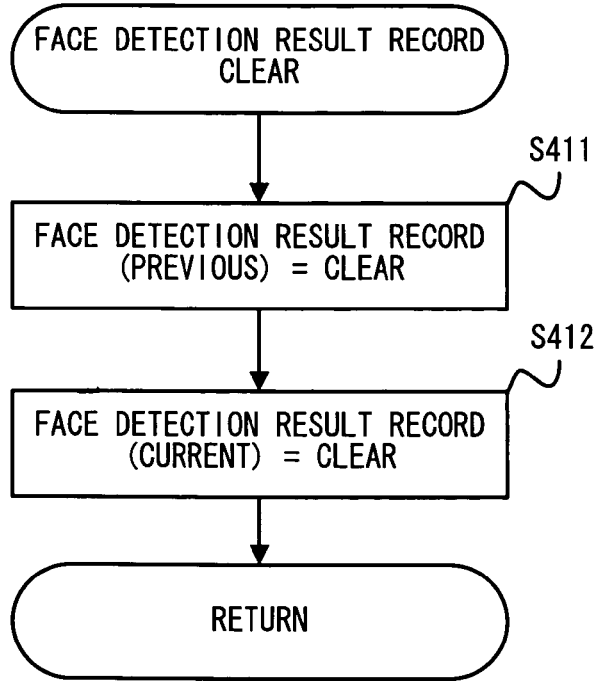
FIG. 6 presents a flowchart of face detection result record clear processing.

The flow of the face detection result record clear processing is explained in reference to the flowchart presented in FIG. 6. In step S411, the control device 1 clears the contents set in (previous) in the face detection result record before the operation proceeds to step S412. In step S412, the control device 1 clears the contents set in (current) in the face detection result record before the processing in FIG. 6 ends.

Figure 7:
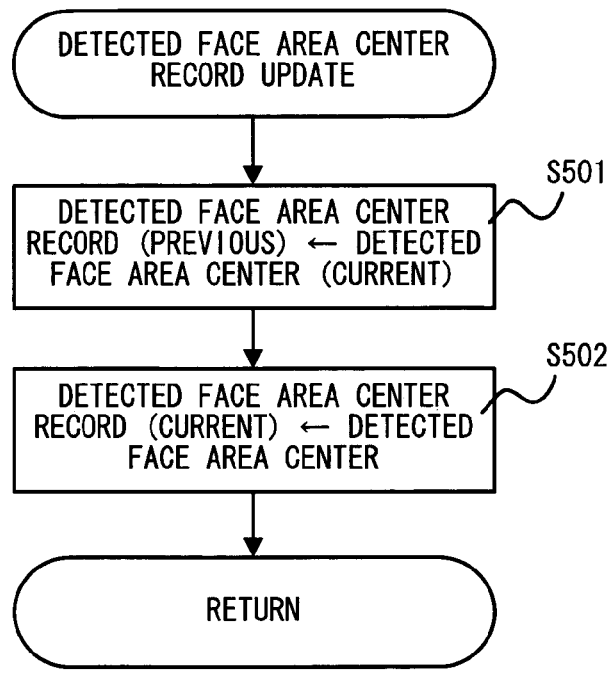
FIG. 7 presents a flowchart of detected face area center record update processing.

The flow of the detected face area center record update processing is explained in reference to the flowchart presented in FIG. 7. In step S501, the control device 1 relocates the contents in (current) in the detected face area center record to (previous) in the detected face area center record and then the operation proceeds to step S502. In step S502, the control device 1 relocates the contents of the face area center setting obtained through the face detection processing to (current) in the detected face area center record before ending the processing in FIG. 7.

Figure 8:
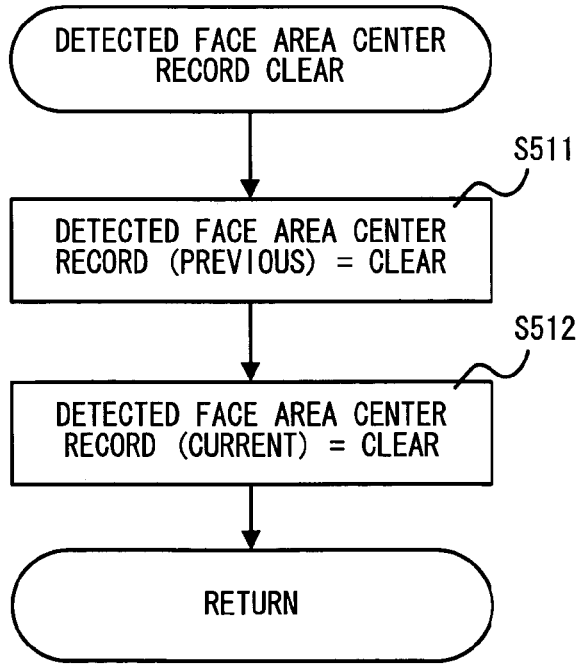
FIG. 8 presents a flowchart of detected face area center record clear processing.

The flow of the detected face area center record clear processing is explained in reference to the flowchart presented in FIG. 8. In step S511, the control device 1 clears the contents set in (previous) in the detected face area center record before the operation proceeds to step S512. In step S512, the control device 1 clears the contents set in (current) in the detected face area center record before the processing in FIG. 8 ends.

Figure 9:
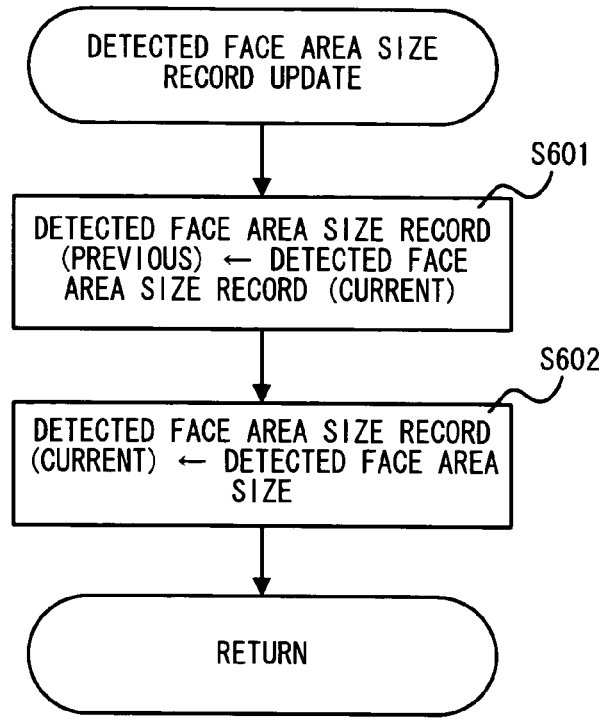
FIG. 9 presents a flowchart of detected face area size record update processing.

The flow of the detected face area size record update processing is explained in reference to the flowchart presented in FIG. 9. In step S601, the control device 1 relocates the contents in (current) in the detected face area size record to (previous) in the detected face area size record and then the operation proceeds to step S602. In step S602, the control device 1 relocates the detected face area size ascertained through the face detection processing to (current) in the detected face area size record before ending the processing in FIG. 9.

Figure 10:
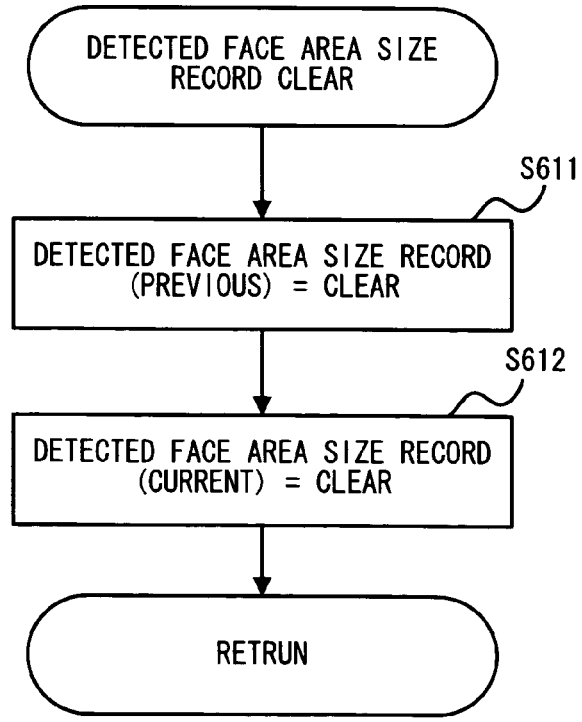
FIG. 10 presents a flowchart of detected face area size record clear processing.

The flow of the detected face area size record clear processing is explained in reference to the flowchart presented in FIG. 10. In step S611, the control device 1 clears the contents set in (previous) in the detected face area size record before the operation proceeds to step S612. In step S612, the control device 1 clears the contents set in (current) in the detected face area size record before the processing in FIG. 10 ends.

Figure 11:
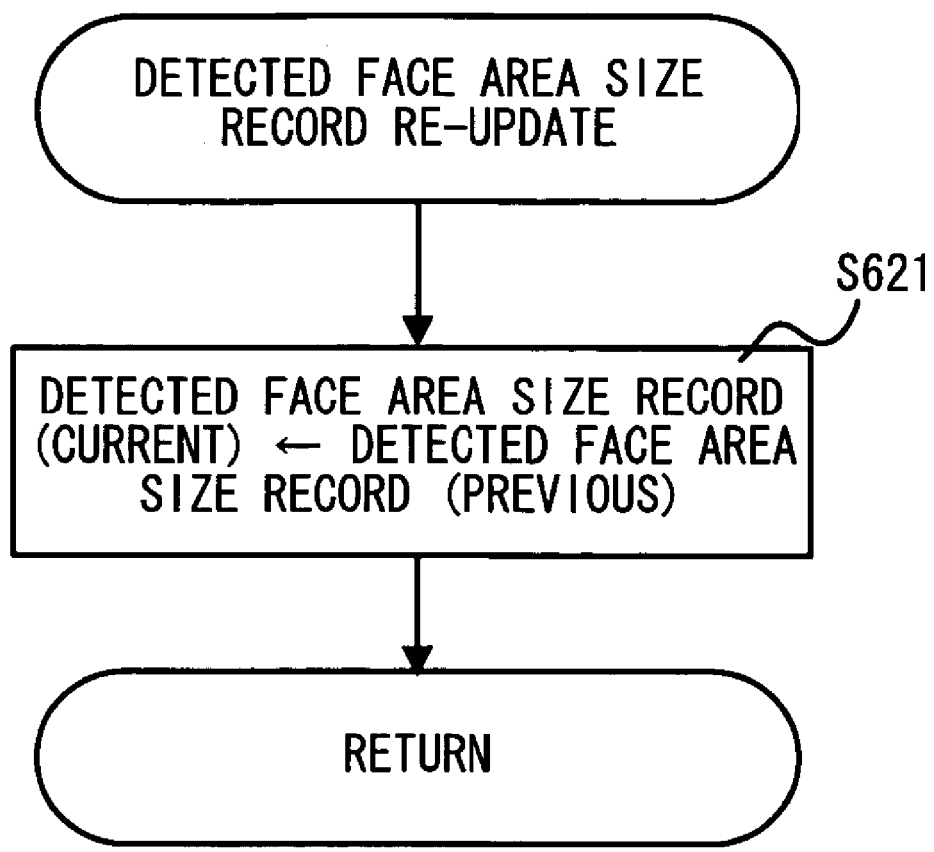
FIG. 11 presents a flowchart of detected face area size record re-update processing.

The flow of the detected face area size record re-update processing is explained in reference to the flowchart presented in FIG. 11. In step S621, the control device 1 relocates the details in (previous) in the detected face area size record to (current) in the detected face area size record before ending the processing in FIG. 11.

Figure 12:
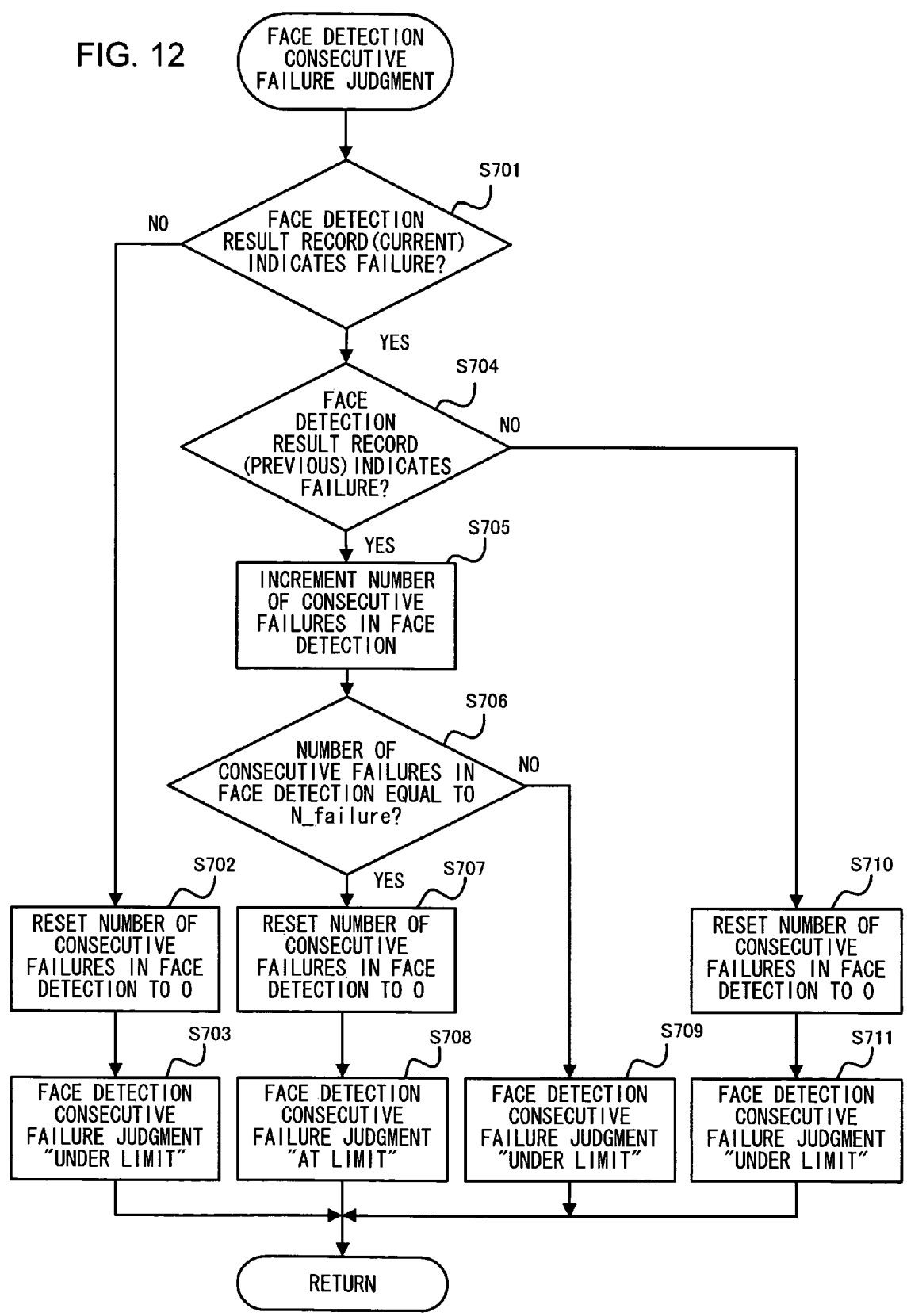
FIG. 12 presents a flowchart of face detection consecutive failure judgment processing.

The flow of the face detection consecutive failure judgment processing is now explained in reference to the flowchart presented in FIG. 12. In step S701, the control device 1 makes a decision as to whether or not the contents set in (current) in the face detection result record indicate a failure. The control device 1 makes a negative decision in step S701 unless the contents set in (current) in the face detection result record indicate a failure to proceed to step S702, whereas it makes an affirmative decision in step S701 if the contents set in (current) in the face detection result record indicate a failure to proceed to step S704.

In step S702, the control device 1 resets the number of consecutive failures in the face detection to 0 before the operation proceeds to step S703. In step S703, the control device 1 sets the face detection consecutive failure judgment flag to "under limit" before ending the processing in FIG. 12.

In step S704, to which the operation proceeds after making an affirmative decision in step S701, the control device 1 makes a decision as to whether or not the contents set in (previous) in the face detection result record indicate a failure. The control device 1 makes a negative decision in step S704 unless the contents set in (previous) in the face detection result record indicate a failure to proceed to step S710, whereas it makes an affirmative decision in step S704 if the contents set in (previous) in the face detection result record indicate a failure to proceed to step S705.

In step S705, the control device 1 increments the number of consecutive failures in the face detection and then the operation proceeds to step S706. In step S706, the control device 1 makes a decision as to whether or not the number of consecutive failures in the face detection has become equal to a predetermined value N_failure (e.g., 2 failures). The control device 1 makes an affirmative decision in step S706 if the number of consecutive failures has become equal to the predetermined value N_failure to proceed to step S707, whereas it makes a negative decision in step S706 if the number of consecutive failures has not become equal to the predetermined value N_failure to proceed to step S709.

In step S707, the control device 1 resets the number of consecutive failures in the face detection to 0 before the operation proceeds to step S708. In step S708, the control device 1 sets the face detection consecutive failure judgment flag to "at limit" before ending the processing in FIG. 12. In step S709, the control device 1 sets the face detection consecutive failure judgment flag to "under limit" before ending the processing in FIG. 12.

In step S710, to which the operation proceeds after making a negative decision in step S704, the control device 1 resets the number of consecutive failures in the face detection to 0 before the operation proceeds to step S711. In step S711, the control device 1 sets the face detection consecutive failure judgment flag to "under limit" before ending the processing in FIG. 12.

Figure 13:
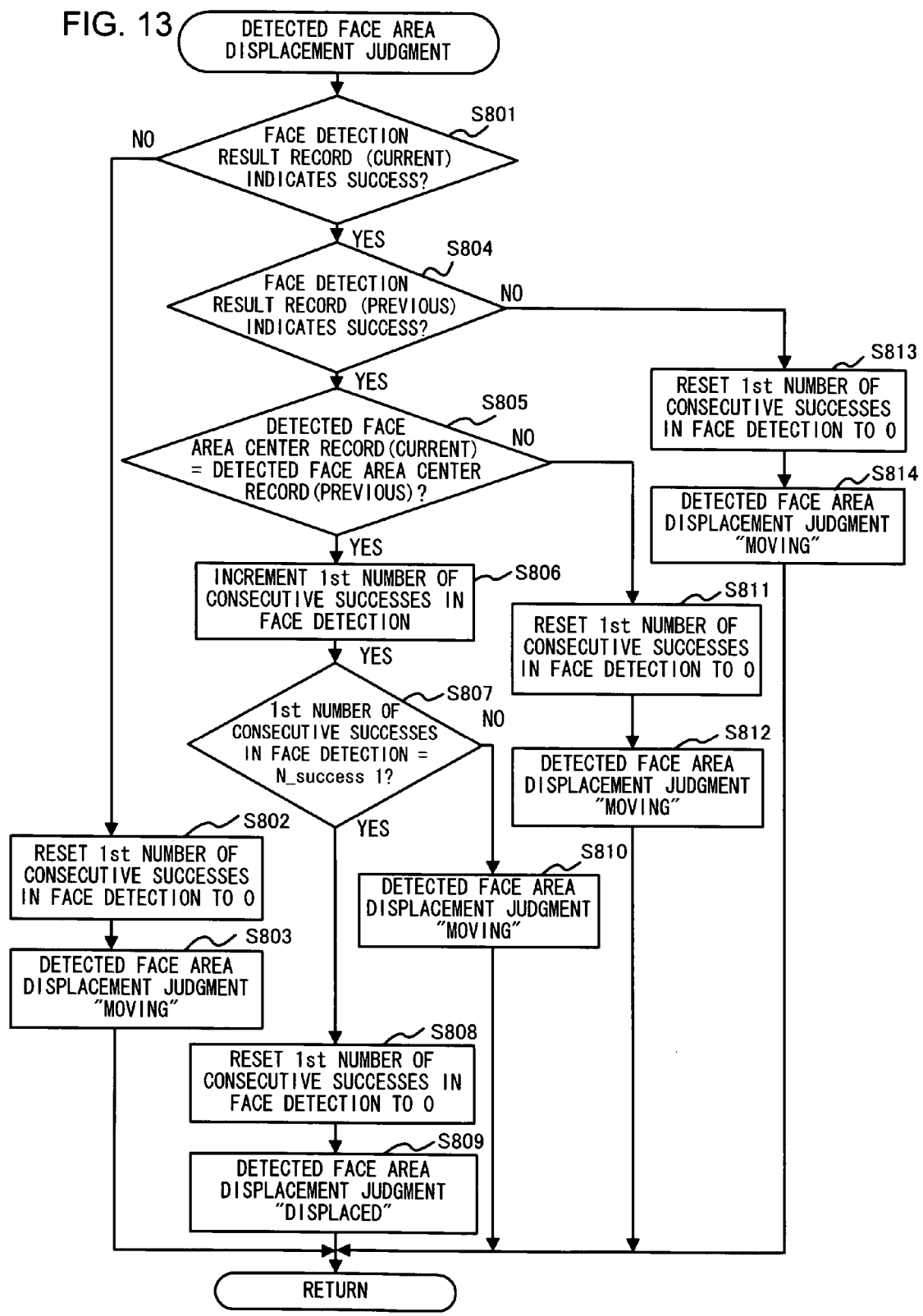
FIG. 13 presents a flowchart of detected face area displacement judgment processing.

The flow of the detected face area displacement judgment processing is now explained in reference to the flowchart presented in FIG. 13. In step S801, the control device 1 makes a decision as to whether or not the contents set in (current) in the face detection result record indicates a success. The control device 1 makes a negative decision in step S801 unless the contents set in (current) in the face detection result record indicate a success to proceed to step S802, whereas it makes an affirmative decision in step S801 if the contents set in (current) in the face detection result record indicate a success to proceed to step S804.

In step S802, the control device 1 resets a first number of consecutive successes in the face detection to 0 and then the operation proceeds to step S803. In step S803, the control device 1 sets the detected face area displacement judgment flag to "moving" before ending the processing in FIG. 13.

In step S804, to which the operation proceeds after making an affirmative decision in step S801, the control device 1 makes a decision as to whether or not the contents set in (previous) in the face detection result record indicate a success. The control device 1 makes a negative decision in step S804 unless the contents set in (previous) in the face detection result record indicate a success to proceed to step S813, whereas it makes an affirmative decision in step S804 if the contents set in (previous) in the face detection result record indicate a success to proceed to step S805.

In step S805, the control device 1 makes a decision as to whether or not the contents set in (current) in the detected face area center record match the contents set in (previous) in the detected face area center record. This decision may be made by, for instance, dividing the coordinate space into four quadrants defined with two rectilinear lines extending perpendicular to each other. The control device 1 makes an affirmative decision in step S805 to proceed to step 806 if the contents set in (current) in the detected face area center record and the contents set in (previous) in the detected face area center record both indicate positions contained in a common quadrant. If, on the other hand, the contents set in (current) in the detected face area center record and the contents set in (previous) in the detected face area center record indicate positions contained in different quadrants, the control device makes a negative decision in step S805 to proceed to step S811.

In step S806, the control device 1 increments the first number of consecutive successes in the face detection, before the operation proceeds to step S807. In step S807, the control device 1 makes a decision as to whether or not the first number of consecutive successes in the face detection has become equal to a predetermined value N_success 1 (e.g., 10 successes). The control device 1 makes an affirmative decision in step S807 if the first number of consecutive successes has become equal to the predetermined value N_success 1 to proceed to step S808, whereas it makes a negative decision in step S807 if the first number of consecutive successes has not become equal to the predetermined value N_success 1 to proceed to step S810.

In step S808, the control device 1 resets the first number of consecutive successes in the face detection to 0 before the operation proceeds to step S809. In step S809, the control device 1 sets the detected face area displacement judgment flag to "displaced" before ending the processing in FIG. 13. In step S810, the control device 1 sets the detected face area displacement judgment flag to "moving" before ending the processing in FIG. 13.

In step S811, to which the operation proceeds after making a negative decision in step S805, the control device 1 resets the first number of consecutive successes in the face detection to 0 before the operation proceeds to step S812. In step S812, the control device 1 sets the detected face area displacement judgment flag to "moving" before ending the processing in FIG. 13.

In step S813, to which the operation proceeds after making a negative decision in step S804, the control device 1 resets the first number of consecutive successes in the face detection to 0 before the operation proceeds to step S814. In step S814, the control device 1 sets the detected face area displacement judgment flag to "moving" before ending the processing in FIG. 13.

Figure 14:
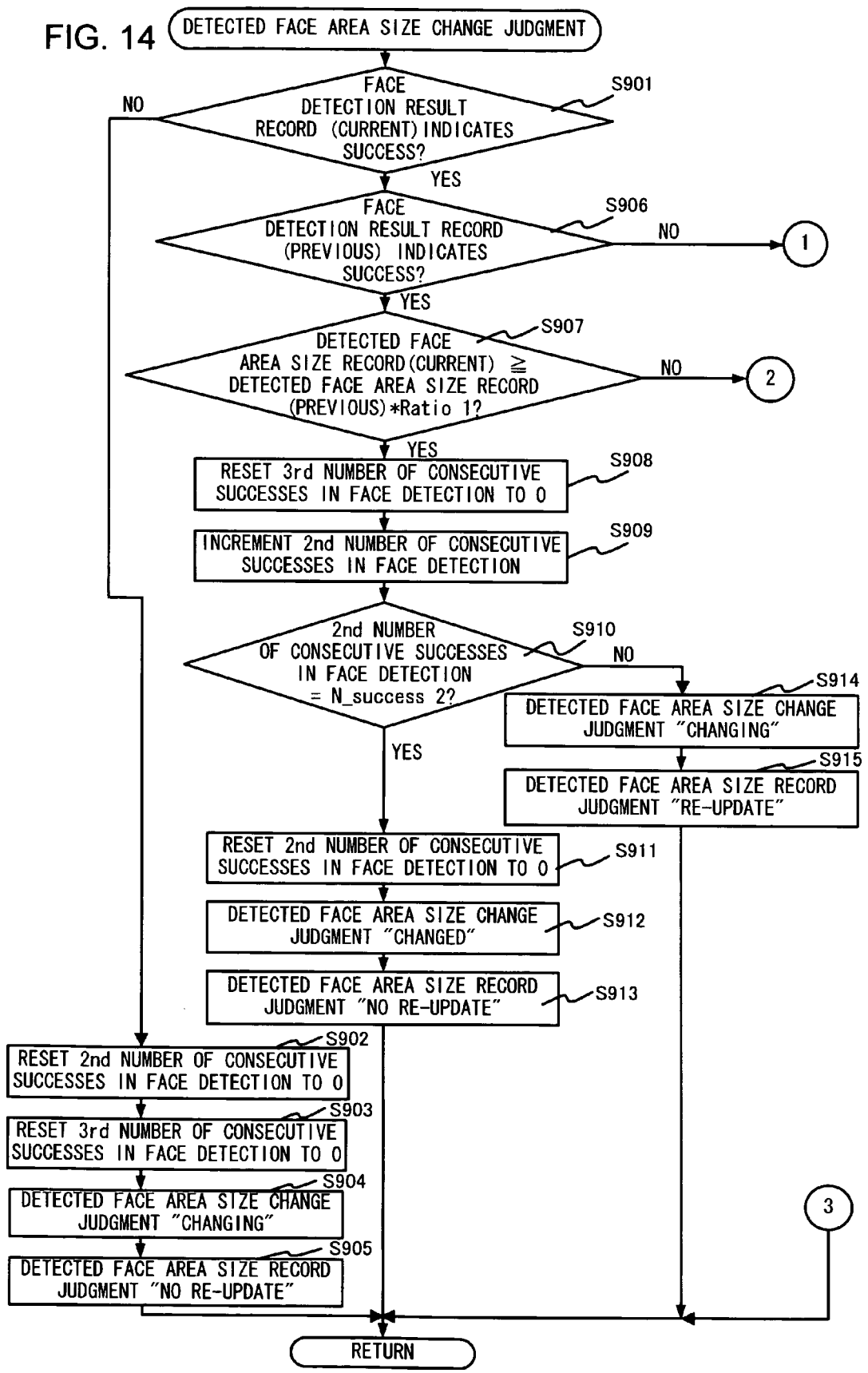
FIG. 14 presents a flowchart of detected face area size change judgment processing.
Figure 15:
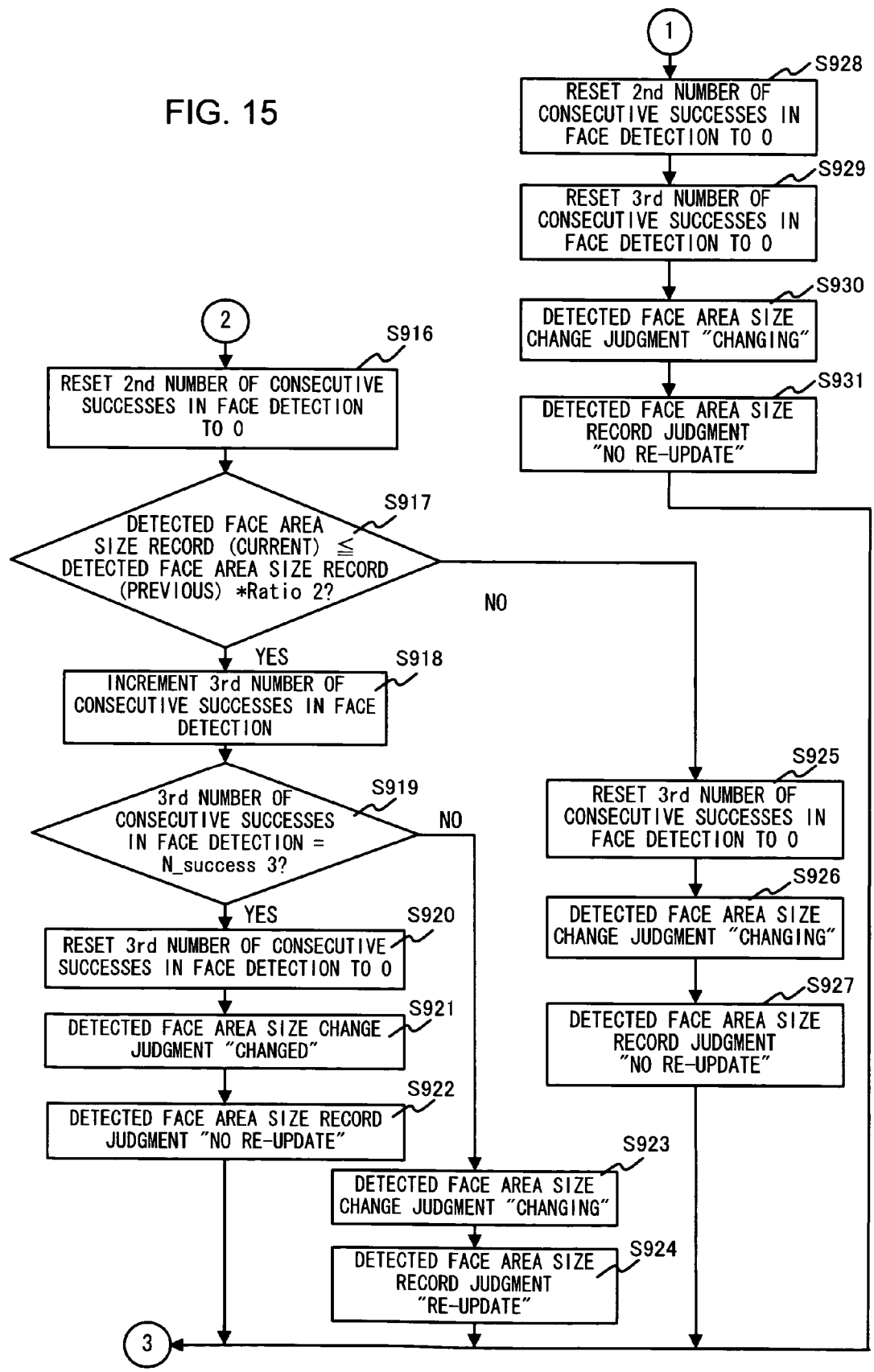
FIG. 15 presents a flowchart of the detected face area size change judgment processing in continuation from FIG. 14.

The flow of the detected face area size change judgment processing is now explained in reference to the flowchart presented in FIGS. 14 and 15. In step S901 in FIG. 14, the control device 1 makes a decision as to whether or not the contents set in (current) in the face detection result record indicate a success. The control device 1 makes a negative decision in step S901 unless the contents set in (current) in the face detection result record indicate a success to proceed to step S902, whereas it makes an affirmative decision in step S901 if the contents set in (current) in the face detection result record indicate a success to proceed to step S906.

In step S902, the control device 1 resets a second number of consecutive successes in the face detection to 0 and then the operation proceeds to step S903. In step S903, the control device 1 resets a third number of consecutive successes in the face detection to 0 and then the operation proceeds to step S904. In step S904, the control device 1 sets the detected face area size change judgment flag to "changing" and then the operation proceeds to step S905. In step S905, the control device 1 sets the detected face area size record judgment flag to "no re-update", before ending the processing in the flowchart presented in FIGS. 14 and 15.

In step S906, to which the operation proceeds after making an affirmative decision in step S901, the control device 1 makes a decision as to whether or not the contents set in (previous) in the face detection result record indicate a success. The control device 1 makes a negative decision in step S906 unless the contents set in (previous) in the face detection result record indicate success to proceed to step S928 in FIG. 15, whereas it makes an affirmative decision in step S906 if the contents set in (previous) in the face detection result record indicate a success to proceed to step S907.

In step S907, the control device 1 makes a decision as to whether or not the contents set in (current) in the detected face area size record indicate a value equal to or greater than the product of the value indicated by the detail set in (previous) in the detected face area size record and a predetermined coefficient (Ratio 1). The control device 1 makes an affirmative decision in step S907 if the value indicated in (current) is equal to or greater than the product to proceed to step S908, whereas it makes a negative decision in step S907 if such a relationship is not satisfied to proceed to step S916 in FIG. 15.

In step S908, the control device 1 resets the third number of consecutive successes in the face detection to 0 before the operation proceeds to step S909. In step S909, the control device 1 increments the second number of consecutive successes in the face detection and then the operation proceeds to step S910. In step S910, the control device 1 makes a decision as to whether or not the second number of consecutive successes in the face detection has become equal to a predetermined value N_success 2 (e.g., 10 successes). The control device 1 makes an affirmative decision in step S910 if the second number of consecutive successes has become equal to the predetermined value N_success 2 to proceed to step S911, whereas it makes a negative decision in step S910 if the second number of consecutive success has not become equal to the predetermined value N_success 2 to proceed to step S914.

In step S911, the control device 1 resets the second number of consecutive successes in the face detection to 0 before the operation proceeds to step S912. In step S912, the control device 1 sets the detected face area size change judgment flag to "changed" and then the operation proceeds to step S913. In step S913, the control device 1 sets the detected face area size record judgment flag to "no re-update", before ending the processing in the flowchart presented in FIGS. 14 and 15.

In step S914, to which the operation proceeds after making a negative decision in step S910, the control device 1 sets the detected face area size change judgment flag to "changing" and then the operation proceeds to step S915. In step S915, the control device 1 sets the detected face area size record judgment flag to "re-update", before ending the processing in the flowchart presented in FIGS. 14 and 15.

In step S916 in FIG. 15, to which the operation proceeds after making a negative decision in step S907, the control device 1 resets the second number of consecutive successes in the face detection to 0 and then the operation proceeds to step S917. In step S917, the control device 1 makes a decision as to whether or not the contents set in (current) in the detected face area size record indicate a value equal to or less than the product of the value indicated by the detail set in (previous) in the detected face area size record and a predetermined coefficient (Ratio 2). The control device 1 makes an affirmative decision in step S917 if the value indicated in (current) is equal to or less than the product to proceed to step S918, whereas it makes an affirmative decision in step S917 if such a relationship is not satisfied to proceed to step S925.

In step S918, the control device 1 increments the third number of consecutive successes in the face detection before the operation proceeds to step S919. In step S919, the control device 1 makes a decision as to whether or not the third number of consecutive successes in the face detection has become equal to a predetermined value N_success 3 (e.g., 10 successes). The control device 1 makes an affirmative decision in step S919 if the third number of consecutive successes has become equal to the predetermined value N_success 3 to proceed to step S920, whereas it makes a negative decision in step S919 if the third number of consecutive successes has not become equal to the predetermined value N_success 3 to proceed to step S923.

In step S920, the control device 1 resets the third number of consecutive successes in the face detection to 0 before the operation proceeds to step S921. In step S921, the control device 1 sets the detected face area size change judgment flag to "changed" and then the operation proceeds to step S922. In step S922, the control device 1 sets the detected face area size record judgment flag to "no re-update", before ending the processing in the flowchart presented in FIGS. 14 and 15.

In step S923, to which the operation proceeds after making a negative decision in step S919, the control device 1 sets the detected face area size change judgment flag to "changing" and then the operation proceeds to step S924. In step S924, the control device 1 sets the detected face area size record judgment flag to "re-update", before ending the processing in the flowchart presented in FIGS. 14 and 15.

In step S925 to which the operation proceeds after making a negative decision in step S917, the control device 1 resets the third number of consecutive successes in the face detection to 0 before the operation proceeds to step S926. In step S926, the control device 1 sets the detected face area size change judgment flag to "changing" and then the operation proceeds to step S927. In step S927, the control device 1 sets the detected face area size record judgment flag to "no re-update", before ending the processing in the flowchart presented in FIGS. 14 and 15.

In step S928 to which the operation proceeds after making a negative decision in step S906, the control device 1 resets the second number of consecutive successes in the face detection to 0 before the operation proceeds to step S929. In step S929, the control device 1 resets the third number of consecutive successes in the face detection to 0 before the operation proceeds to step S930. In step S930, the control device 1 sets the detected face area size change judgment flag to "changing", and the operation proceeds to step S931. In step S931, the control device 1 sets the detected face area size record judgment flag to "no re-update" before ending the processing in the flowchart presented in FIGS. 14 and 15.

The change rate used in the face area size change judgment described above when the face area increases (S 907), i.e., the predetermined coefficient Ratio 1 should be set smaller than the change rate used in the face area size change judgment when the face area decreases (S 917), i.e., the predetermined coefficient Ratio 2. For instance, the predetermined coefficient Ratio 1 may be set so as to assume a change rate of 5% when the face area increases and the predetermined coefficient Ratio 2 may be set so as to assume a change rate of 10% when the face area decreases. Since the focus adjustment is executed more frequently especially when the face of a person moves closer to the camera in the vicinity of the camera, the response of the AF processing is improved by selecting such values for Ratios 1 and 2.

The following operational effects can be achieved in the embodiment described above.

(1) As the photographing mode for setting the AF area by executing the face detection processing is selected, i.e., as an ON signal is input from the photographing mode selector switch 11, the autofocus apparatus first drives the focus lens 31 to the initial position (step S202), which is suitable for photographing portraits, and then executes face detection (step S203). By selecting the initial setting so as to focus on the subject present over a photographing distance at which a person is likely to be photographed for a portrait, it is ensured that the focus on the through image used for the first face detection (step S203) is not poorly adjusted. This facilitates face detection (step S203), which, in turn, reduces the length of time required for the processing.

(2) The operation proceeds to execute the regular processing in step S208 and beyond after executing AF processing (step S207) over the AF area set based upon the results of the first face detection (step S203). Thus, a through image in focus can be quickly brought up on display at the display device 9.

(3) During the processing executed in step S208 and beyond, the operation returns to step S208 without executing the AF processing (step S230) if the detected face area (face area) having been detected through the face detection processing has not been displaced (a negative decision is made in step S222) and the face area size (range) has not changed (a negative decision is made in step S225). Thus, since the AF processing is not executed each time the face detection processing is executed as long as the position or the size of the person in the photographic image plane remains unaltered, redundant AF processing is minimized. As a result, the focus adjustment is executed only when necessary in the autofocus apparatus.

(4) It is decided that the detected face area has been displaced (step S809) only if the detected face area center is present in the same quadrant as that having contained the detected face area center previously (an affirmative decision is made in step S805) and the number of consecutive successes in the face detection has become equal to a predetermined value (an affirmative decision is made in step S807). In other words, the decision of "displaced" is not made if the detected face area center is in the process of moving between quadrants or if the detected face area center has not remained in a given quadrant very long. In this manner, the reliable judgment can be made as to whether or not the detection face area center has been displaced.

(5) It is decided that the face area size has changed (step S912) if the increase rate is equal to or greater than a predetermined coefficient (Ratio 1) (an affirmative decision is made in step S907) and the second number of consecutive successes in the face detection has become equal to the predetermined value N_success 2 (an affirmative decision is made in step S910). Since the decision that the face area size has changed is not made if the increase rate is small or the size does not continuously increase. In this manner, the accurate judgment can be made when the size is increasing.

(6) It is decided that the face area size has changed (step S921) if the decrease rate is equal to or greater than a predetermined coefficient (Ratio 2) (an affirmative decision is made in step S917) and the third number of consecutive successes in the face detection has become equal to the predetermined value N_success 3 (an affirmative decision is made in step S919). Since the decision that the face area size has changed is not made if the decrease rate is small or the size does not continuously decrease, the accurate judgment can be made when the size is decreasing.

(7) Even during the processing executed in step S208 and beyond, if the number of consecutive failures in the face detection has become equal to a predetermined value (an affirmative decision is made in step S217), the operation returns to step S202 and resumes the face detection. Since the focus lens 31 is driven to the initial position as it was driven to the initial position for the first face detection, the focus in the through image is not poorly adjusted. This, in turn, facilitates the face detection (step S203) and reduces the length of time required for the processing.

(8) If a plurality of faces is detected, the face area ranging over a largest area is selected as the AF area and thus, the focus is adjusted on the face of the person present closest to the camera.

(Variation 1)

While an explanation is given above on an example in which the displacement of the face area is judged by dividing the photographic image plane into four areas (quadrants), the judgment may instead be made by dividing the photographic image plane into eight or sixteen portions. By judging the face area displacement in conjunction with a greater number of divided areas of the photographic image plane, a finer movement of the face area can be detected.

(Variation 2)

Alternatively, the decision as to the face area displacement may be made based upon motion vectors as is known in the related art. In this case, the control device 1, having extracted a "face" from the image signals corresponding to each frame, calculates the motion vector between the frames. The motion vector thus calculated indicates the extent to which the face area has moved from one frame to another.

(Variation 3)

In the example explained above, the detected face area is simply designated as the AF area. Alternatively, the image signals corresponding to the eyes may be extracted from the image signals for the face area and an area of a predetermined size ranging around the extracted eyes may be designated as the AF area. In this case, the focus can be specifically adjusted on the eyes.

(Variation 4)

As an alternative to variation 3, the image signals corresponding to the eyes may be extracted from the image signals for the face area and an area of a predetermined size ranging around a position displaced from the extracted eyes towards the center of the face by a predetermined extent may be designated as the AF area. In this case, the focus can be adjusted as intended by the photographer.

While an explanation is given above on an example in which the face detection technology is adopted when the AF area determining device (control device 1) sets (determines) the AF area, a technology for simply detecting a specific color area may be adopted instead. Alternatively, the AF area may be set by extracting an area containing an image signal indicating a signal value equal to or higher than a predetermined brightness level. In either of these cases, too, AF processing should be executed if the specific color area or a range containing the image signal indicating a signal value equal to or higher than a predetermined brightness level, having been set as the AF area, has been displaced by using the image signals contained in the range after the displacement. In addition, if the size of the image signal range having been set as the AF area has changed, the AF processing should be executed by using the image signals in the range having undergone the size change.

While an explanation is given above in reference to the embodiment on an example in which the autofocus apparatus is mounted in a digital camera, the present invention is not limited to this example, and the autofocus apparatus may be mounted in a digital video camera or a silver halide camera.

The above described embodiment is an example and various modifications can be made without departing from the scope of the invention.

What is claimed is:

1. An autofocus apparatus comprising:
an imaging device that captures a subject image through a photographic lens;
an AF area determining device that determines a range of image signals to be used for autofocus adjustment based upon the subject in image signals provided by the imaging device, the AF area determining device detecting changes in the subject, and if, after detecting changes in the subject, the AF area determining device continuously detects a state in which the subject does not change for a predetermined number of times, it is determined that the range of image signals used for autofocus adjustment is altered;
a focus adjustment device that adjusts a focal point position achieved through the photographic lens by driving a focus lens so as to maximize contrast achieved with the image signals in the determined range; and
a control device that controls the focus adjustment device, if the range of the image signals determined by the AF area determining device has been altered, so as to adjust the focal point position by using image signals in the altered range.

2. An autofocus apparatus according to claim 1, wherein:
if the range of the image signals determined by the AF area determining device has been displaced, the control device controls the focus adjustment device so as to adjust the focal point position by using image signals in the displaced range.

3. An autofocus apparatus according to claim 2, further comprising:
a face detection device that detects a face of a person by using the image signals provided by the imaging device, wherein:
the AF area determining device determines the range of the image signals to be used for the autofocus adjustment by using image signals corresponding to the face detected by the face detection device; and
if a position of the face detected by the face detection device has been displaced, the control device controls the focus adjustment device so as to adjust the focal point position by using image signals corresponding to the displaced face.

4. An autofocus apparatus according to claim 3, wherein:
the control device judges that the position of the face has been displaced if the position of the face detected by the face detection device has moved between areas of a photographic image plane divided into a predetermined number of areas and the face is successively detected a predetermined number of times in a divided area following the displacement.

5. An autofocus apparatus according to claim 3, wherein:
the control device does not engage the focus adjustment device in the focus adjustment if the face detection device has not detected a face.

6. An autofocus apparatus according to claim 3, wherein:
the control device controls the focus adjustment device so as to first drive the focus lens to a predetermined position at start-up; and the face detection device starts face detection once the focus lens is driven to the predetermined position.

7. An autofocus apparatus according to claim 6, wherein:
the control device engages the focus adjustment device in the focus adjustment when a face is first detected by the face detection device after the focus lens is driven to the predetermined position.

8. An autofocus apparatus according to claim 3, wherein:
the control device controls the focus adjustment device so as to drive the focus lens to a predetermined position if the face detection device has successively failed to detect a face a predetermined number of times; and
the face detection device resumes face detection when the focus lens is driven to the predetermined position.

9. An autofocus apparatus according to claim 3, wherein:
the focus adjustment device adjusts the focal point position by using image signals corresponding to a face ranging over a largest area if a plurality of faces has been detected by the face detection device.

10. An autofocus apparatus according to claim 3, wherein:
the focus adjustment device adjusts the focal point position by using image signals corresponding to a predetermined area around eyes in the face detected by the face detection device.

11. An autofocus apparatus according to claim 3, wherein:
the focus adjustment device adjusts the focal point position by using image signals corresponding to a predetermined area ranging around a position offset from eyes in the face detected by the face detection device by a predetermined extent toward a center of the face.

12. An autofocus apparatus according to claim 1, wherein:
if an area size of the range of the image signals determined by the AF area determining device has changed, the control device controls the focus adjustment device so as to adjust the focal point position by using image signals in the range the area size of which has been changed.

13. An autofocus apparatus according to claim 12, further comprising:
a face detection device that detects a face of a person by using the image signals provided by the imaging device, wherein:
the AF area determining device determines the range of the image signals to be used for the autofocus adjustment by using image signals corresponding to the face detected by the face detection device; and
if an area size of the face detected by the face detection device has changed, the control device controls the focus adjustment device so as to adjust the focal point position by using image signals corresponding to the face the area size of which has been changed.

14. An autofocus apparatus according to claim 13, wherein:
the control device judges that the face area size has changed if the face detection device has detected an increase in the face area size at a rate equal to or greater than a predetermined increase rate and then has repeatedly detected the face area size substantially unchanged a predetermined number of times.

15. An autofocus apparatus according to claim 13, wherein:
the control device judges that the face area size has changed if the face detection device has detected a decrease in the face area size at a rate equal to or greater than a predetermined decrease rate and then has repeatedly detected the face area size substantially unchanged a predetermined number of times.

16. An autofocus apparatus according to claim 13, wherein:
the control device does not engage the focus adjustment device in the focus adjustment if the face detection device has not detected a face.

17. An autofocus apparatus according to claim 13, wherein:
the control device controls the focus adjustment device so as to first drive the focus lens to a predetermined position at start-up; and
the face detection device starts face detection once the focus lens is driven to the predetermined position.

18. An autofocus apparatus according to claim 17, wherein:
the control device engages the focus adjustment device in the focus adjustment when a face is first detected by the face detection device after the focus lens is driven to the predetermined position.

19. An autofocus apparatus according to claim 13, wherein:
the control device controls the focus adjustment device so as to drive the focus lens to a predetermined position if the face detection device has successively failed to detect a face a predetermined number of times; and
the face detection device resumes face detection when the focus lens is driven to the predetermined position.

20. An autofocus apparatus according to claim 19, wherein:
the control device engages the focus adjustment device in the focus adjustment when a face is first detected by the face detection device after the focus lens is driven to the predetermined position.

21. An autofocus apparatus according to claim 13, wherein:
the focus adjustment device adjusts the focal point position by using image signals corresponding to a face ranging over a largest area if a plurality of faces has been detected by the face detection device.

22. An autofocus apparatus according to claim 13, wherein:
the focus adjustment device adjusts the focal point position by using image signals corresponding to a predetermined area around eyes in the face detected by the face detection device.

23. An autofocus apparatus according to claim 13, wherein:
the focus adjustment device adjusts the focal point position by using image signals corresponding to a predetermined area ranging around a position offset from eyes in the face detected by the face detection device by a predetermined extent toward a center of the face.

24. An autofocus apparatus according to claim 1, wherein:
the focus adjustment device adjusts the focal point position before an operation signal is output from a shutter release operation member.

25. A camera, comprising:
an autofocus apparatus that comprises:
an imaging device that captures a subject image through a photographic lens;
an AF area determining device that determines a range of image signals to be used for autofocus adjustment based upon the subject in image signals provided by the imaging device, the AF area determining device detecting changes in the subject, and if, after detecting changes in the subject, the AF area determining device continuously detects a state in which the subject does not change for a predetermined number of times, it is determined that the range of image signals used for autofocus adjustment is altered;

a focus adjustment device that adjusts a focal point position achieved through the photographic lens by driving a focus lens so as to maximize contrast achieved with the image signals in the determined range; and a control device that controls the focus adjustment device if the range of the image signals determined by the AF area determining device has been altered so as to adjust the focal point position by using image signals in the altered range.

26. An autofocus control method, comprising:

determining a range of image signals to be used for autofocus adjustment by using a subject in image signals captured through a photographic lens;

determining that the range of image signals used for autofocus is altered if a state is continuously detected in which the subject does not change for a predetermined number of times;

adjusting a focal point position achieved via the photographic lens by driving a focus lens so as to maximize contrast achieved with the image signals; and adjusting the focal point position following an alteration in the range of the image signals to be used for the autofocus adjustment by using image signals in the altered range.

* * * * *